United States Patent [19]

Yanagihara et al.

[11] 4,217,939
[45] Aug. 19, 1980

[54] METHOD FOR MANUFACTURING ELECTRODE FOR BATTERY

[75] Inventors: Nobuyuki Yanagihara, Hirakata; Isao Matsumoto, Osaka; Mamoru Ishitobi, Neyagawa; Tsutomu Iwaki, Yawata, all of Japan

[73] Assignee: Matsushita Electric Industrial Co., Ltd., Japan

[21] Appl. No.: 952,542

[22] Filed: Oct. 18, 1978

[30] Foreign Application Priority Data

| Oct. 20, 1977 | [JP] | Japan | 52-126561 |
| Oct. 20, 1977 | [JP] | Japan | 52-126562 |
| Oct. 28, 1977 | [JP] | Japan | 52-130047 |
| Oct. 28, 1977 | [JP] | Japan | 52-130048 |

[51] Int. Cl.$^3$ .......................................... H01M 4/82
[52] U.S. Cl. .......................................... 141/1.1; 141/9; 141/125; 141/126; 366/150
[58] Field of Search ........................ 29/623.1, 623.5; 141/1.1, 9, 32, 33, 100, 104, 113, 125, 131, 280, 283, 224, 126; 252/425.3; 429/233, 241; 366/150

[56] References Cited

U.S. PATENT DOCUMENTS

| 1,147,009 | 7/1915 | Engel | 141/33 |
| 1,518,226 | 12/1924 | Shepherd | 141/33 |
| 1,882,300 | 10/1932 | Price et al. | 141/33 |
| 4,050,482 | 9/1977 | Ching et al. | 141/32 X |

Primary Examiner—Frederick R. Schmidt
Attorney, Agent, or Firm—Wenderoth, Lind & Ponack

[57] ABSTRACT

An improved method of mass producing a battery electrode made of porous metal having uniformly impregnated therein a large amount of active material which comprises applying to the outer surface of a porous metal having continuously interlinked pore portions an active material in paste form and scrubbing the outer surface of the porous metal with a scrubber while agitating the active material disposed below the porous metal by means of a stirrer.

7 Claims, 17 Drawing Figures

METHOD FOR MANUFACTURING ELECTRODE FOR BATTERY

This invention relates to a method for manufacturing a battery electrode made of porous metal of three dimensional structure (hereinafter referred to as foam metal) having continuously interlinked pore portions, so as to sufficiently impregnate said formed metal with an active material. This invention offers the most suitable condition for impregnating the active material in the form of a paste into the continuously interlinked pore portions of the porous metal by means of a tool, e.g. made of rubber, scrubbing the outer surface of the porous metal. In addition, this invention provides efficient conditions for impregnating the porous metal which is impregnated into, e.g. alcohol beforehand. Also, this invention provides a method to increase the amount of the active material impregnated into the porous metal by employing a powdered active material to impregnate the porous metal during or after the active material in paste form is impregnated into the porous metal.

The representative known methods of manufacturing well-known positive electrode of alkaline battery are as follows. At first, (A) as the container for the current conductor for the active material, metal mesh or thin porous plate of conductive nickel or iron-nickel plate, etc. is used. The nickel powders are impregnated, with little pressing, in a carbon mold. Then, they are sintered at temperature of, for example, approximately 900° C. in a hydrogen atmosphere and are made into a porous substratum of 70 to 80% in porosity. In addition, the porous substratum is impregnated with a high concentration of nickel nitrate solution and is dried. Then, after being electrolyzed in a thick potassium hydroxide solution of high temperatures, it is water-washed and dried. Alternatively, after a dipping operation in alkaline solution, it is decomposed with heat treatment. Problems arose in employing these methods in mass production, since the process for impregnating the active material was complicated and the impregnating operation was required to be repeated.

As one method of solving the problem, a non-sintered electrode body, where the impregnation of the active paste material is simplified, has been proposed. An active material mixed with an adhesive material was coated on the non-sintered electrode body and the metal mesh, and thereafter was pressed. However, the active material could not be rapidly impregnated thus resulting in a rapid capacity decrease and it was thus difficult to impregnate a large amount of active materials. Thus, (B) as the active material container for battery, a foam metal is used. The active material mixed with the adhesive material is impregnated into the foam metal. As the active material is impregnated into the foamed porous metal of three dimensional structure, the pressed non-sintered electrode body is reduced in capacity decrease due to release of the active material. Also, the more active material which can be impregnated, the higher the capacitance.

However, a problem occurred because the active material was not uniformly impregnated into the interior of the pore portions of the foam metal simply by passing of the porous metal into the active paste material. In such process the active material was automatically impregnated continuously into the long belt type of foam metal in mass production. However, it was discovered that displacing the air in the foam metal by the active material was required in order to automatically impregnate the active material into the continuously moving long belt type of foam metal.

Accordingly, the present invention has been developed with a view to substantially eliminating the disadvantages and inconveniences inherent in the prior art method for production of battery electrodes and is intended to provide an improved battery electrode having good characteristics by the employment of a novel and progressive method for manufacturing it. It involves sufficiently impregnating a porous metal having continuously interlinked pore portions with active material in such a manner that the porous metal is dipped into and is moving within a body of active material in the form of a paste, so as to impregnate the active material into the pore portions thereof.

Another object of the present invention is to provide a method of manufacturing an improved battery electrode of the above type, which exhibits stable, uniform and high capacity with long life, through simple processes in a large quantity and also at low cost for utilization thereof for production of the porous metal having uniformly impregnated therein a large amount of active material.

According to the present invention, there is provided an improved method for manufacturing a battery electrode made of porous metal having continuous pore portions impregnated with active material comprising the steps of continuously supplying at an active material in paste form onto the outer surface of the porous metal having three dimensional structure, moving a scrubber relative to the porous metal to scrub the outer surface thereof, thereby to cause forcible impregnation of the active material into the pore portion of the porous metal. Further, when the active material supply is below the lower surface of the porous metal, a stirrer is provided to agitate the active material in paste form so as to contact the porous metal with the active material paste and uniformly impregnate the active material into the pore portion of the porous metal.

These and other objects and features of the present invention will become apparent from the following description taken in conjunction with preferred embodiments thereof with reference to the accompanying drawings, in which.

Figure 4:
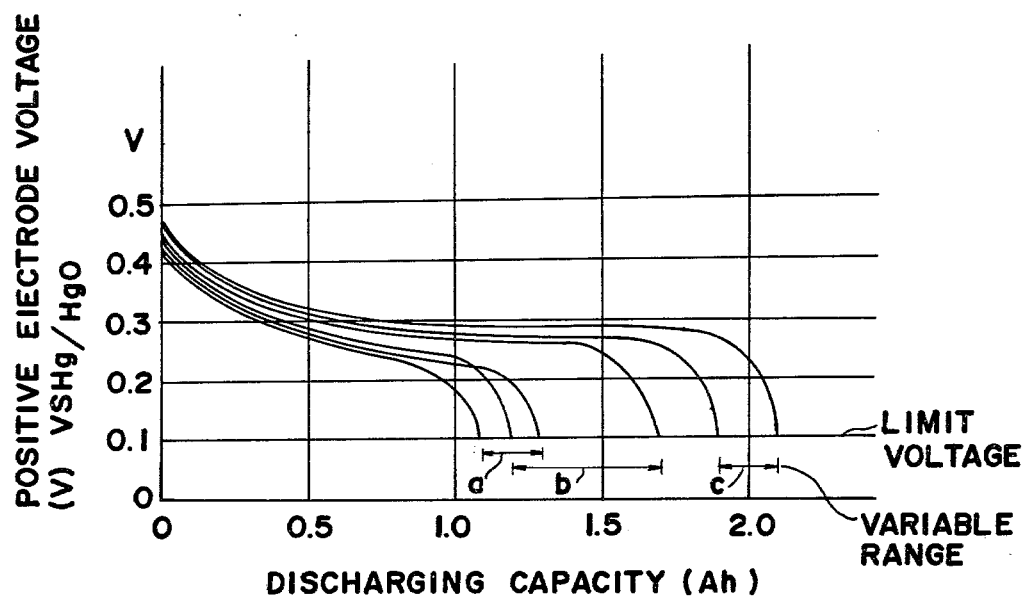
Figure 5:
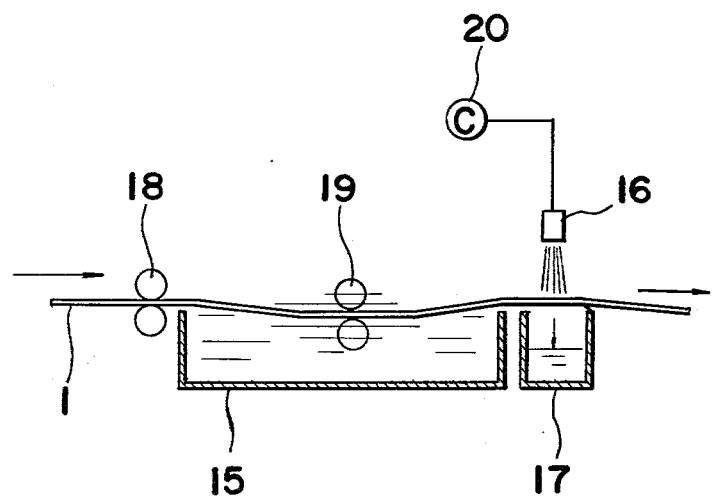
Figure 6:
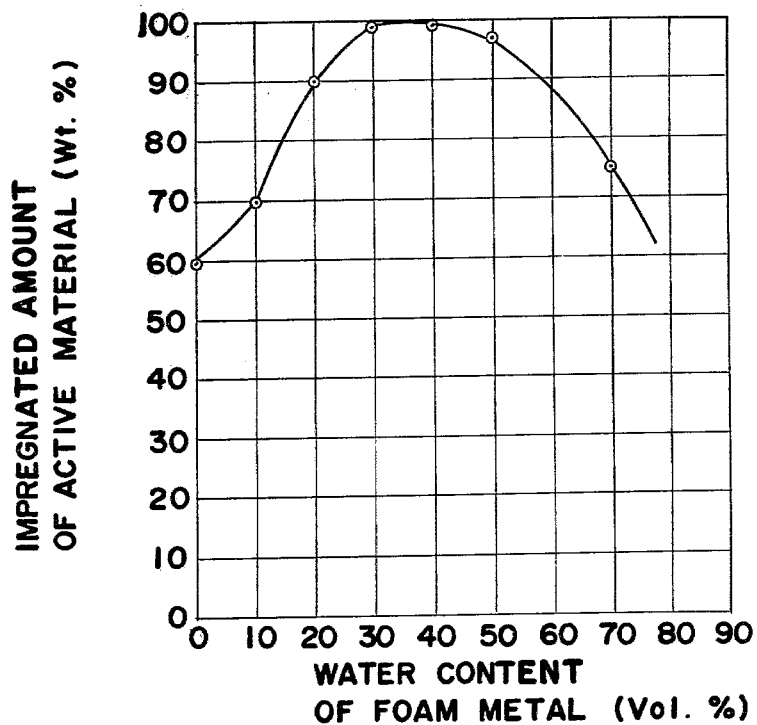
Figure 7:
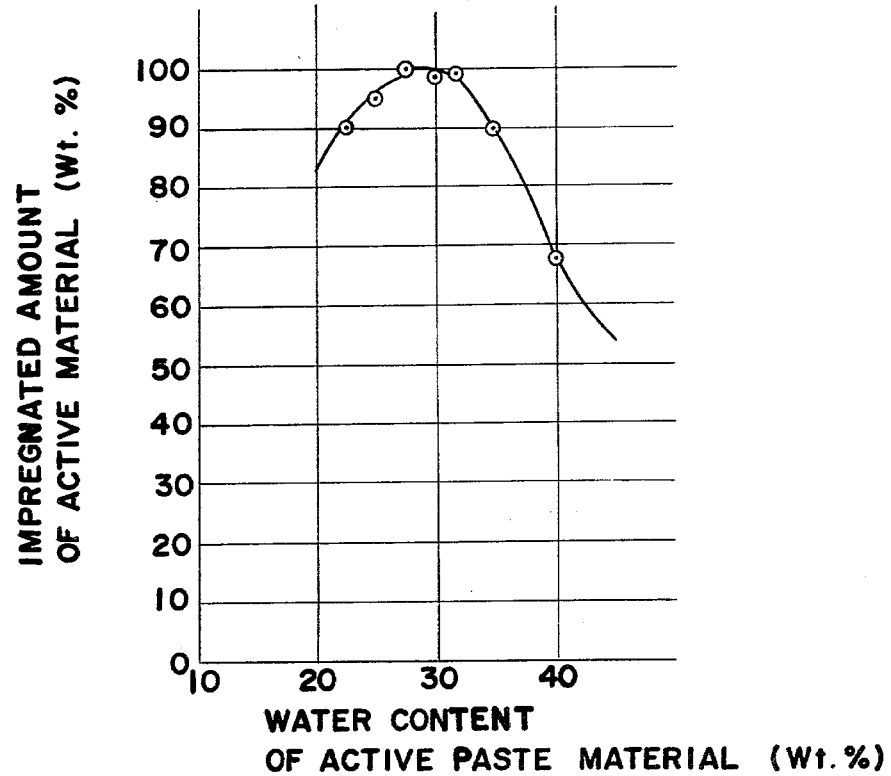
Figure 8:
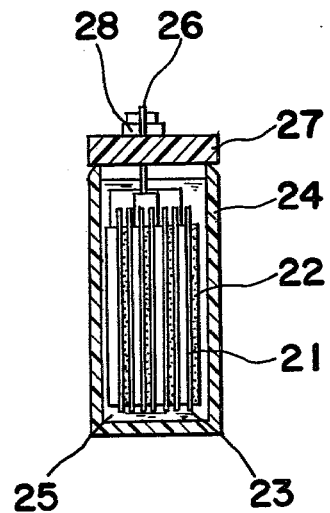
Figure 9:
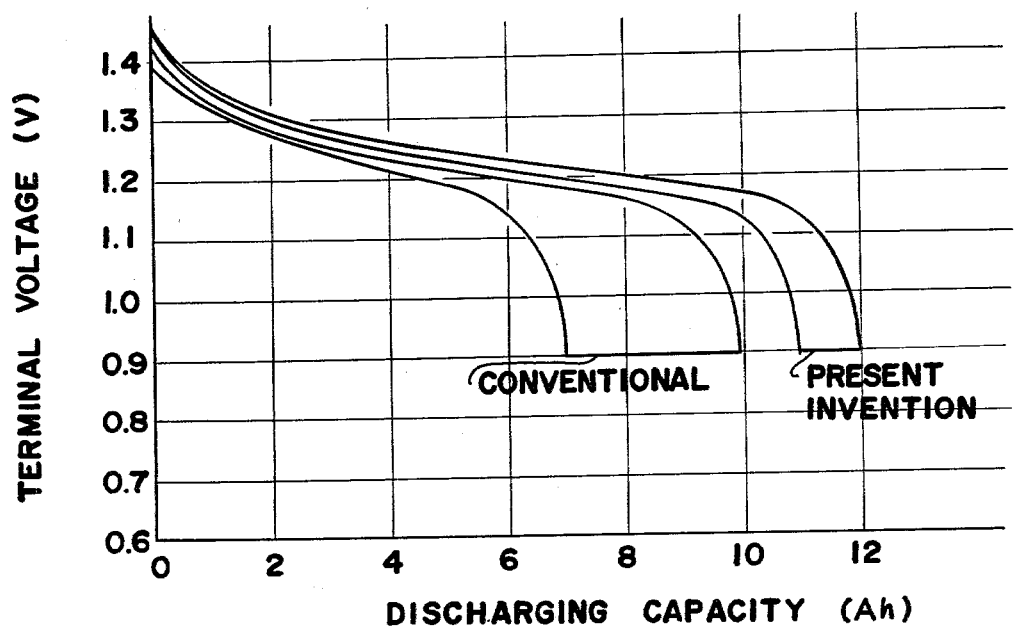

FIGS. 3(A), 3(B) and 3(C) are views each illustrating the impregnation of a foam metal;

FIG. 4 is a discharge characteristic graph of a battery with electrodes made with a foam metal impregnated by method of the present invention;

FIG. 5 is a view illustrating another embodiment of the present invention;

FIG. 6 is a graph showing the relationship between the water content of the foam metal, and the impregnated amount of the active material;

FIG. 7 is a graph showing the relationship between the water content of the paste of active material and the impregnated amount of the active material;

FIG. 8 is a constructional view of a battery for characteristic comparison;

FIG. 9 is a graph showing the relationship between discharge capacity and terminal voltage for a conventional material and a material of the present invention.

Figure 10:
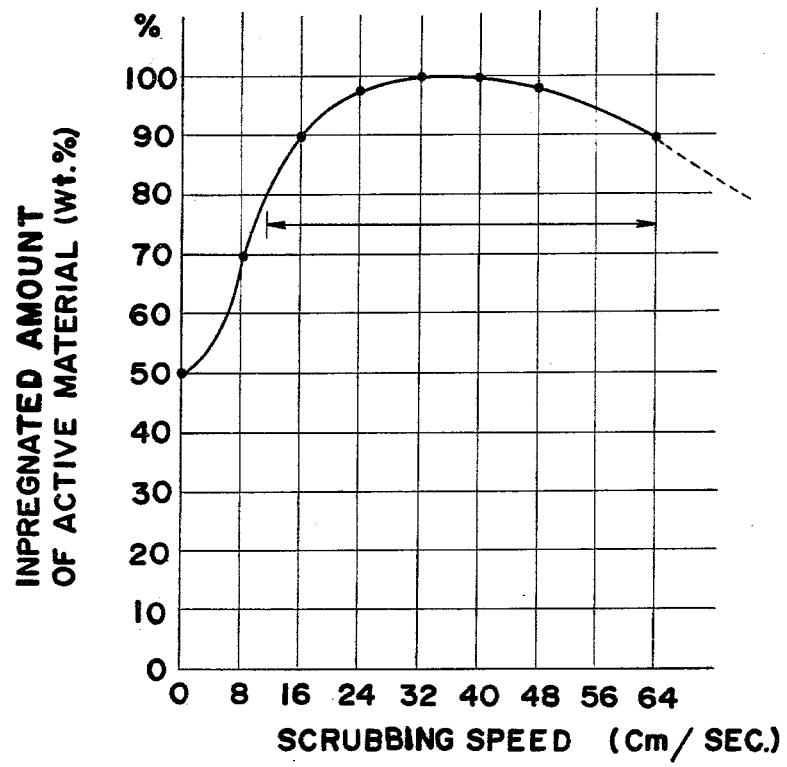
Figure 11:
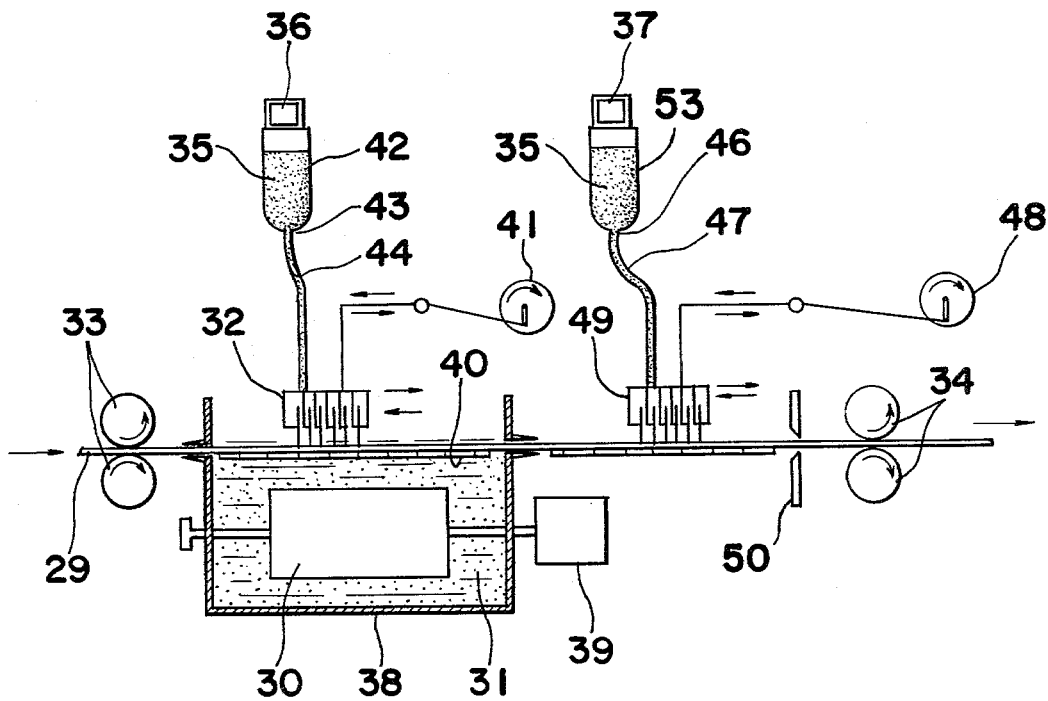
Figure 12:
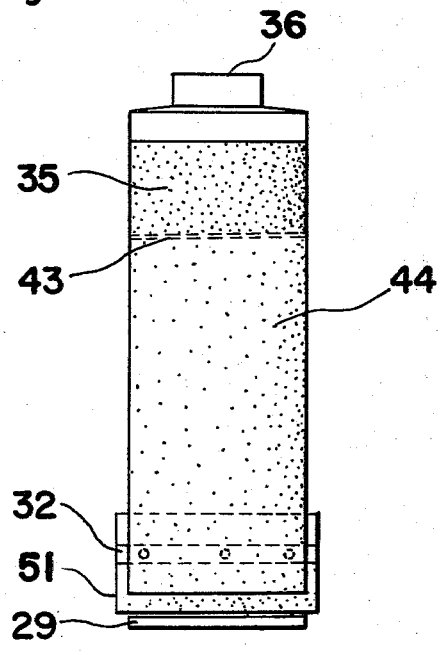
Figure 13:
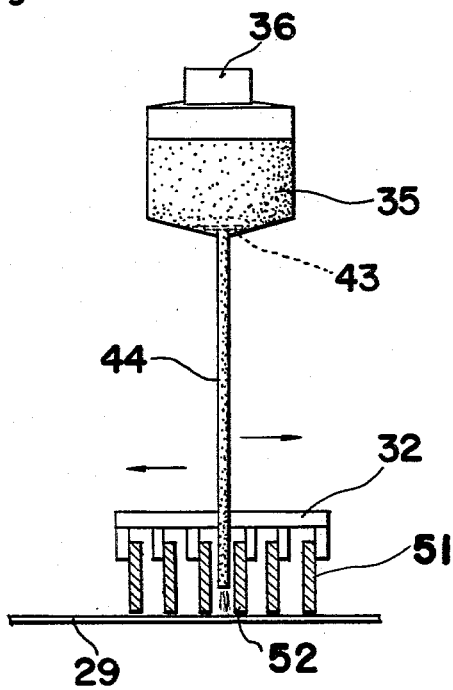
Figure 14:
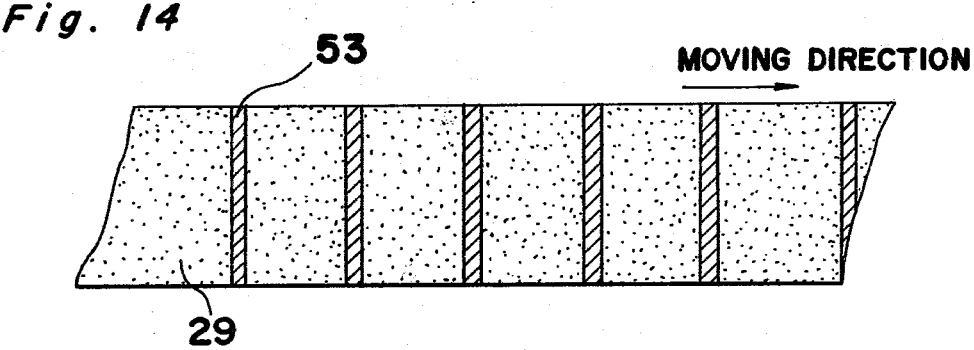
Figure 15:
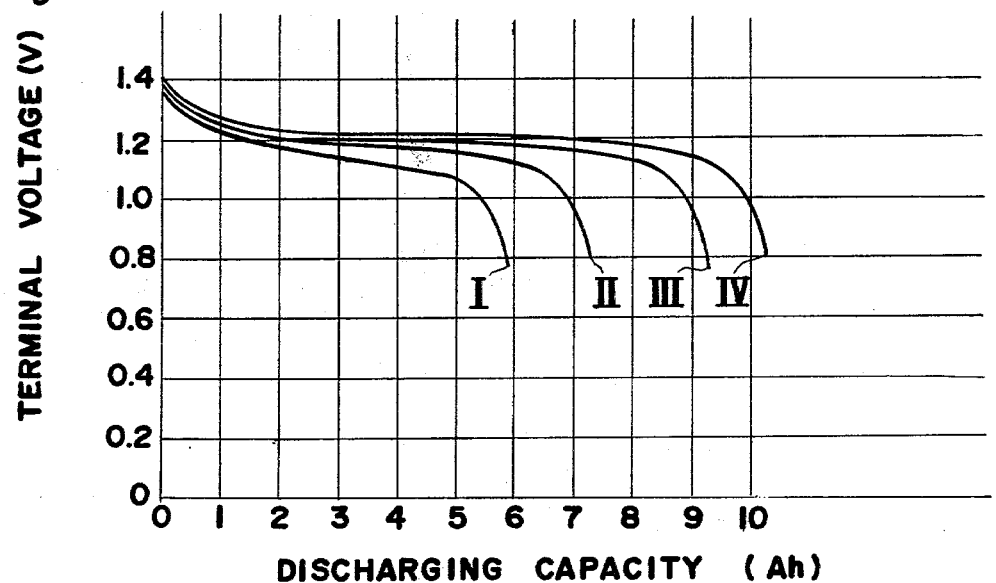

FIG. 10 is a view showing the relationship between the moving speed of the scrubber and the impregnation rate;

FIG. 11 is a view for illustrating the manufacturing method in a further embodiment of the present invention;

FIGS. 12 and 13 are essential portion constructional views of FIG. 11, respectively;

FIG. 14 is a top plane view of a foam metal into which the active material is impregnated by the method of FIG. 11; and FIG. 15 is a graph showing the effect of the manufacturing method of FIG. 11 in terms of discharge capacity versus terminal voltage.

Figure 1:
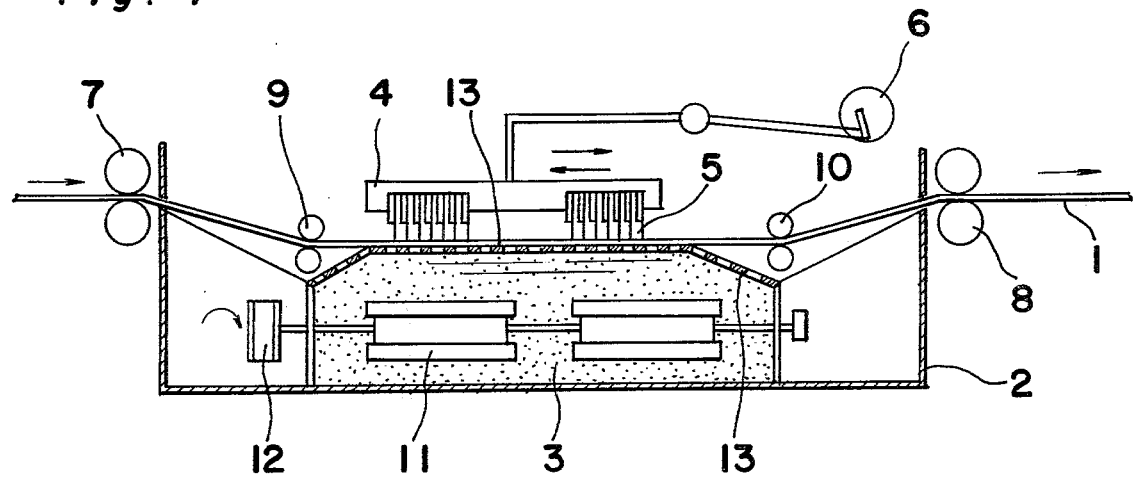
FIG. 1 is a constructional view of a continuous type active material impregnating apparatus in one embodiment of the method of the present invention.
Figure 2:
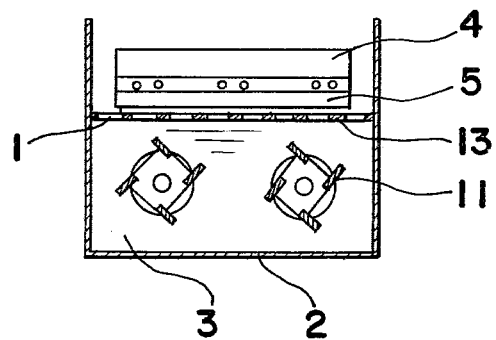
FIG. 2 is a cross-sectional view of the active material impregnating portion of FIG. 1.

At first, the construction of a continuous type of active material impregnating apparatus will be described with reference to FIG. 1. Nickel powder of approximately 10 percents is added as the conductive material to nickel hydroxide power available on the market. It is mixed and stirred properly. Then, a proper amount of water or carboxymethylcellulose solution is added thereto. Furthermore, it is properly stirred to form the active paste material. The active paste material is put into an active material vessel 2. A motor 12 for driving the stirrer is actuated to rotate a rotary type stirrer 11 thereby to further mix the active paste material 3 properly. The amount of the active material is adjusted so that the active paste material 3 may rise above a porous plate 13. The long belt type of foam metal 1 is manually moved through a pair of auxiliary rollers 9 from a pair of main shaft rollers 7. The foam metal is moved through a pair of auxiliary rollers 10 from between the porous plate 13 and spatulas 5, which are mounted on a scrubber 4 composed of e.g. rubber spatulas, up to the main shaft rollers 8. Then, the long belt type of foam metal is adapted to be moved through the automatic rotation of the main shaft rollers 7 and 8. Upon actuation of the main shaft rollers 7 and 8, the scrubber 4 is slidingly operated along the direction of foam metal movement by the scrubber driving motor 6. As described hereinabove, the active paste material is adapted to be impregnated, by the sliding motion, on the foam metal, of the stirrer 11 and the scrubber 4, into the continuously moving long belt type of foam metal. The schematic view of the construction is shown in FIG. 1 and FIG. 2.

The impregnating mechanism of the active paste material will be described hereinafter.

First, after the stirrer 11 and the scrubber 4 have been reciprocatingly driven, the main shaft rollers 7 and 8 are driven to drive the long belt type of foam metal 1 little by little. As shown in FIG. 2, the stirrer 11 uses two sets of eight wings, each set having four wings. Each set is adapted to rotate so that the active material may be pressed from the central portion of the vessel 2 towards the peripheral portion of the vessel in an expanded state. While the active material moves on the surface portion of the foam metal, the scrubber performs its reciprocating parallel motion with respect to the advancing direction of the foam metal. Thus, the active material on the top face portion of the foam metal is adapted to be scrubbed by a scrubber. Such operation as described hereinabove is continuously performed to continuously impress the active material into the foam metal. The impregnating conditions of the active materials are as follows.

The foam metal used is, for instance, 15 cm wide, 5 m long, and 2.5 mm thick with 96±1% in porosity. Total volume of the impregnated portion of the active material is approximately 50 l. The active paste material of approximately 80 kg is positioned inside the impregnating apparatus. The scrubber with rubber spatulas is 16 cm, the rubber spatulas is 3 mm thick, and the number of the rubber spatulas is ten. The scrubber is 80 mm in amplitude and 1 cycle per second in speed. The revolution speed of the stirrer is three to five revolutions per second. The moving speed of the foam metal is 0.5 mm per second. The paste concentration is approximately 70% by weight.

Figure 3:
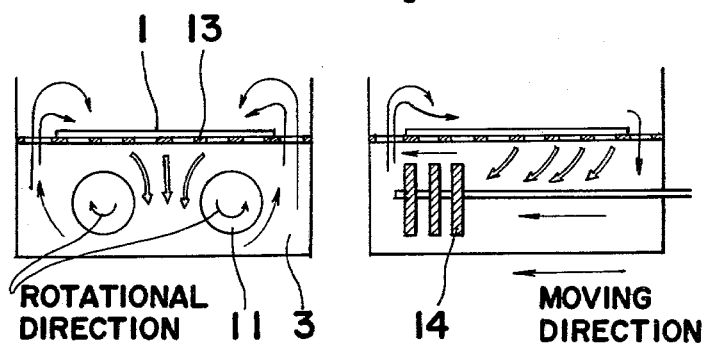
Figure 3:
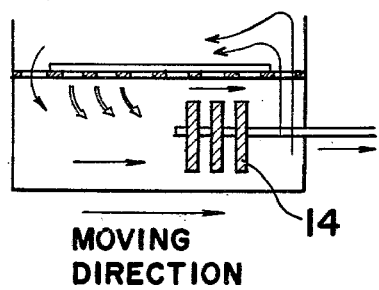

More detailed impregnating condition of the active paste material is shown in FIG. 3 according to the above-described conditions.

FIG. 3(A) shows the movement of the active material by the stirrers. As shown in FIGS. 3(B) and 3(C), the movement of the active material by a horizontal type stirrer 14 is provided as another example. In FIG. 3(A), two stirrers are rotated, respectively, so that the active material may move to the peripheral portion from the central portion. Namely, the active material is stirred so that it may rise to the top face of the foam metal through the peripheral portion from the central portion. Accordingly, the central portion becomes reduced in pressure and a reduced pressure or suction phenomenon occurs on the underside of the foam metal. The active material, which is moved in an expanded from the peripheral portion, is impregnated into the foam metal, by the spatulas on the scrubber, on the top face of the foam metal.

In the above embodiment, the active paste material is stirred in a vessel below the foam metal and the active paste material is guided to the scrubbing portion. However, the active paste material may be supplied from the top portion of the foam metal. In the case of the embodiment of FIG. 1, the following effects are provided.

Namely, in one type of mixing operation with breathing where the active material goes into the interior from the top face portion of the foam metal, and some portion of the active material passes from the underside portion, thus uniformly impregnating the active material into the whole foam metal, the expanded portion is formed and the compressed portion is formed in response to the expanded portion to allow the efficient impregnation of the active material. The impregnating efficiency is improved as compared with the case where stirring is employed. Also, this mixing with is more effective than the conventional operation if the stirring operation is performed to prevent the active material from separating solid body of liquid and the active material from becoming unequal in concentration distribution. Moreover, the active materials are uniformly impregnated.

Also, as shown in FIGS. 3(B) and 3(C), even when the stirrer is of a horizontal type, a plate-shaped stirrer is used normal to the direction of progress of the foam metal. When the stirrer is laterally (or horizontally) moved, the active material rises, towards one periphery, in the direction in which the active material is pushed and is pushed to the top face portion of the foam metal. In response thereto, the opposite side direction becomes a direction in which the active material is pulled and the pressure is slightly reduced, thus absorbing the material from the underside of the foam metal. The thick arrows in FIG. 3 show the direction of absorbing the active material. As the active material is pressed by the scrubber, on the top face portion of the foam metal and sucked on the underside portion, a kind of active material circulation occurs. The active material is adapted to be sufficiently impregnated into the interior of the foam metal. By the stirring and impregnating method of using the pressing operation, i.e., pushing-up, scrubbing-in and the pressure reducing operation, i.e. pulling as described hereinabove, more active material can be uniformly impregnated more efficiently into the foam metal. Thus, superior method of mass producing battery electrodes can be obtained.

Also, it is desirable to have the stirring direction of the active paste material arranged normal in direction to the direction of progress of the moving foam metal. To provide efficient impregnation of the active material, the pushing-up operation of the active material and the swelling-up on the foam metal are required to be produced from the peripheral portion.

The stirring operation only on the underside of the foam metal results in reduced amount of impregnation.

Accordingly, effective stirring causes movement of active material in rectangular cycles following the direction of progress of the foam metal.

The impregnating operation can be performed only through the stirring of the active material, but the impregnating amount is likely to become unequal.

The direction of scrubbing the moving foam metal with the scrubber will be described. The direction of movement of the foam metal is desirably parallel. For example, when the scrubber is moved in the direction normal to the direction of progress of the moving foam metal, the active material which has become swollen or expanded from the periphery is pushed back or is restored to the former state. The active material cannot be impregnated efficiently on the top face portion of the foam metal. Namely, the active material on the top face portion of the foam metal is downwardly pressed without being extended through the foam metal, thus resulting in poor impregnating efficiency. Accordingly, it is more effective to perform the scrubbing operation of the active material in the parallel direction with respect to the direction of progress of the moving foam metal. Then, the electrode is manufactured as follows from the foam metal wherein the active material is impregnated by the impregnating apparatus.

The long belt type foam metal substratum, with the active material contained therein, manufactured by the apparatus of FIG. 1 is cut into proper sizes and is dried. The foam metal substratum cut into proper sizes dipped in the dispersion of fluorine resin of 3% by weight. Thereafter, they are pressed, with the pressing force of 400 kg per cm$^2$, in the semi-dry condition and are completely dried. The electrodes are cut into 50×55 mm pieces. Lead terminals are mounted thereto. The capacity of the electrode is tested. The distribution test of the capacity is made on approximately ten electrodes, which are selected at random from the proper positions of the long belt type foam metal with the active material contained therein. Nickel plate is used as counter electrode. As the capacity of each of nickel oxide anodes, the electrode-voltage (standard voltage Hg/HgO) is used. The capacity of the anode only and the distribution of the capacity are compared with each other.

As the conventional type of sintered electrode, the nickel oxide anode which is adopted for Ni-Cd battery available on the market, is used for comparison. The capacitance is 1 Ah in practical capacity. The electrode is 50 mm×55 mm in size and 1.1 mm (a) in thickness.

Then, the same foam metal is passed, at a speed of 0.5 mm per second, through the active paste material. The active material is impregnated into the foam metal with a passage time of 10 minutes. Thereafter, the anode (b) is made in the same manner as that of the present invention. As the conditions of the capacity test, the conventional product (a) is discharged by 0.2A, the conventional product (b) and the product (c) of the present invention are discharged by 0.4A. All these products are discharged over an approximately five-hour period (0.2C). All of these products are charged by approximately 130% to 140%. A ten-cycle test in which capacity is stabilized is provided. The discharge characteristics at this time are shown in FIG. 4. According to the discharge capacity of each electrode, the discharge capacity of the electrode of the conventional product (a) is 1.2±0.1 Ah (1.1 to 1.3 Ah) and the electrode discharge capacity of the conventional product (b) is 1.45±0.25 Ah (1.2 to 1.7 Ah). When the electrodes of the same sizes are compared with each other, the discharge capacity of the electrode (c) of the present invention is improved by approximately 1.8 times as compared with the conventional product (a). Namely, the discharge capacity thereof is 2.0±0.1 Ah (1.9 to 2.1 Ah).

Also, the conventional product (b) is greatly varied, in the active amount contained therein, even in the same foam metal. But the amount of impregnation is much less than that of the product of the present application. When the electrode of the conventional product (b) is cut, it is confirmed that the impregnation is not uniform into the interior of the product. Also, the capacity variation is more than twice that of the present invented product, thus resulting in a problem in practical use. The present invention is a method of manufacturing electrodes which are superior not only in voltage, capacity and distribution, but also in productivity.

A method of further improving the impregnation rate of the active material will be described hereinafter. Liquid, which is harmless to the electrode, such as water, alcohol, etc., is impregnated into the foam metal. Thereafter, the liquid content of the active paste material is adjusted while the foam metal is moving. The foam metal is pressed and impregnated through the scrubbing operation by the scrubber. Assume that the liquid content in the foam metal is 20 to 60% of the foam metal on a volume ratio and the liquid content of the active paste material is 23 to 35% in at weight ratio, and many active materials can be impregnated efficiently into the foam metal.

The embodiment will be described hereinafter with reference to the drawings. The construction of the impregnating apparatus for the active material which is used in these experiments will be described hereinafter. This impregnating apparatus has a moisture content adjusting portion provided at the front stage of the active material impregnating process, the moisture content adjusting portion being composed of a moisture containing process and a dehydrating process as shown in FIG. 5.

The moisture content adjusting portion of FIG. 5 is provided at the front stage of the active material impregnating process of FIG. 1. The corresponding components throughout FIG. 1 are represented by the same reference characters.

The long belt type foam metal 1 is extended through a water tank 15 to impregnate water into the foam metal 1. Then, to adjust the moisture content of the foam metal, high-speed air is applied upon the moisture-contained foam metal by a compressed air jetting means 16 to remove the water contained in the foam metal. The compressed air is fed by a compressor 20 to provide the secondary side pressure of 2 kg per cm² at the exit. The water removed from the foam metal 1 is adapted to gather at a water storing container 17.

The long belt type of foam metal 1 is extended through a pair of auxiliary rollers 19, provided inside the water tank 15, from a pair of main shaft rollers 18, provided inside the water tank 15, from a pair of main shaft rollers 18. The foam metal moves to the impregnating apparatus while the moisture content of the foam metal is adjusted through the high speed air blown off from the compressed air jetting means 16.

To adjust the moisture content of the foam metal, the air pressure and air flow of the air jetting means 16 are adjusted so that the air may be jetted at high speed to the interior of the foam metal. The installation position of the air jetting means 16 is also adjusted so that the high-speed air may hit the entire width of the foam metal when the lateral width of the foam metal is 70 mm. Also, the pressure of the compressed air is adjusted between 0 to 3 kg per cm² and the flow thereof is adjusted between 0 to 200 l per minute to vary the conditions, except for the water contained in the foam metal. The water amount contained in the foam metal is varied to provide the optimum conditions in the impregnation of the active material. In addition, the water content in the active paste material is adjusted to approximately 30% by weight and the scrubber stroke is set at 80 mm. and the delivery speed of the foam metal is 0.5 mm per second. If the active paste material contacts the foam metal when the foam metal has no water or solution contained therein, the active paste material cannot impregnate the foam metal, because the air in the foam metal cannot be efficiently replaced by the active material, i.e. many portions containing the air remain in the foam metal. Thus, the active material in required amount cannot be effecitvely impregnated. According to the results of such embodiment, only 60% of the required amount to be impregnated is achieved. As the water content increases gradually, the water becomes an intermediary to improve the contact between the foam metal itself and the active paste material. The air and water contained in the foam metal can be easily replaced by the active material. The portions containing the air are reduced in number and the required amount of active material is adapted to be impregnated.

Particularly, a liquid such as water, alcohol which has no bad influences upon the electrode, or the like, is contained in the foam metal to further promote the replacement with the air and to facilitate entry of the active paste material into the form metal. Under this condition, the maximum value is shown when the water content is 30 to 40% by volume. When the water content is further increased, the impregnation of the active material is reduced. If the active paste material is replaced by the water in the foam metal when the water content in the foam metal becomes excessive, the content of the active material remaining in the foam metal becomes lower and the content of the active material is reduced, thus preventing impregnation in the required amount, because the water of approximately 30% by weight is contained in the active paste material. Accordingly, as the water content in the foam metal increases from a certain boundary, the amount of the active material impregnated is likely to be reduced. As apparent from FIG. 6, the impregnation amount with respect to the foam metal of the active material reduces to 75% by weight when the water content of the foam metal is 79% by volume. Thus, to retain the impregnation rate above 90% by weight, considering the practical use, it is one of important requirements to regulate the water content of the foam metal to within the range of 20 to 60% by volume. When the water content is 20 to 60% by volume, the practical range becomes optimum. It is difficult to realize practical application outside of this range.

In addition, the amount of the impregnated active material into the foam metal varies depending upon the water content in the active paste material. The water content in the foam metal is adjusted to 40% by volume (adjusted to water pressure, 2 kg per cm² in water pressure and 150 l per minute in flow). The scrubbing frequency of the scrubber is set at one cycle per second. However, the stroke of the scrubber is set at 80 mm. And the delivering speed of the foam metal is set at 0.5 mm per second.

The results are shown in FIG. 7. The foam metal is impregnated in the water of approximately 40% by volume and is passed through varying concentrations (water amount) of the active paste material. Thus, the impregnated amount of the active material is different. The water amount is less at the water content (paste concentration is approximately 77%) of approximately 23% by weight or less and the complete paste condition cannot be provided. As the uniform stirring operation cannot be performed, the required amount of the active material cannot be impregnated. Also, as the water content in the active material increases gradually, the impregnated amount of the active material increases. The maximum impregnated amount appears near the water content of approximately 30% by weight. In addition, as the water contained amount increases, the impregnated amount of the active material decreases.

As the water content of the active paste material increases, the amount of the active material itself to be impregnated into the foam metal is reduced due to a large content of water. An extra amount of water can be present throughout the impregnating operation with a low concentration of active paste material. Accordingly, when the extra amount of water is evaporated, the amount active material amount is reduced by the amount of water. In the case of 40% by weight in water content, the impregnation rate is reduced up to 65% by weight as apparent from FIG. 7. In the useful range in practical application, assume that the impregnating rate of the active material becomes 90% by weight, and the water content becomes 23 to 35% by weight. This range represents the optimum conditions. Accordingly, it is important to be regulated the water content in this range from the practical point of view.

For comparison, assume that the foam metal is passed through water or the water tank liquid without any adjustment of the water content of the foam metal and the concentration of the active paste material changes gradually due to much water contained in the foam metal. The impregnating operation of the active material is performed under a condition of large change ranging from 25 to 50% by weight.

Under the above-described conditions, the long belt type foam metal is cut, at proper positions, respectively into a given size. An alkaline battery is made with the foam metal cut into a given size, serving as the positive electrode substratum with the iron electrode substratum, made by a well-known manufacturing method, serving as a negative electrode. In FIG. 8, numeral 21 is a positive electrode. Numeral 22 is a negative electrode.

Numeral 23 is a separator. Numeral 24 is a battery jar. Numeral 25 is electrolyte. Numeral 26 is a lead terminal. Numeral 27 is a cover. Numeral 28 is an inter plug. The positive electrode 21 is 60 to 70 mm in size. The positive electrode uses four electrodes. Likewise, the negative electrode uses four electrodes each being of the same size as the positive electrode. The practical capacity of the battery is 10 Ah. The water content of the foam metal of the present embodiment is adjusted to 20 to 60% by volume. The water content of the active material is regulated within the range of 23 to 35% by weight and the active material is impregnated by scrubbing the top face portion of the foam metal together with the active material, with the scrubbing speed being adjusted to 16 cm per second (stroke 80 mm, one cycle per second) as in the conventional type.

Under the above-described conditions, the long belt type foam metal with the required amount of active amount therein is cut, at proper positions, respectively, into a given size as a positive electrode substratum. The same battery as the conventional type is made. The active material is impregnated so that the battery may be reduced in accordance with the regulation of the positive electrode and the iron electrode may have a greater capacity than the nickel electrode.

FIG. 9 shows the discharge capacity and distribution of a battery of approximately 10 cells, respectively. As the charging and discharging conditions, the discharging operation is performed for five hours at discharge current 2A (0.02C, five-hour rate discharge) and at discharge current 3A. The comparative test of the discharge capacity is made at 10 cycles where the capacity is stabilized.

The conventional product a shows a value of practical capacity or less with large distribution of 7 to 10 Ah in discharge capacity. The conventional product a is lower in value than the product b of the present invention. On the other hand, the product b of the present invention is 11 to 12 Ah is discharge capacity and shows a value of practical capacity or more. The battery capacity is less varied. The voltage characteristics are superior. The battery of the present invention has the active material impregnated uniformly and in large amount. This is one of the great features of the present invention. On the other hand, the conventional type battery is less in discharge capacity and larger in variation. The reason for this is that the impregnating conditions of the active material are irregular in the conventional method as described hereinabove. Namely, the concentration of the active paste material is reduced, the amount of the active material contained in the foam metal becomes unequal, or the concentration of the active paste material itself is greatly varied, thus resulting in a varied impregnated amount, since the water content in the foam metal is excessive before the active material was impregnated.

As described hereinabove, the amount of the active material impregnated is greater and the variation of the capacity is less, since the liquid content of the active material and the liquid content of the foam metal are optimized.

The optimum conditions of the movement of the scrubber will be described hereinafter. The foam metal is 60 mm wide, 2 m long, 2.4 mm thick with a porosity of approximately 96%. The inner volume of the impregnated portion of the active material is about 10 l. The weight of the active paste material is about 15 kg. The revolution speed of the stirrer is set at 1 to 2 revolutions per second. The moving speed of the foam metal is set at 0.5 mm per second. The water content of the foam metal is adjusted to about 40% in volume ratio, while the water content of the active paste material is adjusted to about 30% in weight ratio.

Under such conditions, the scrubbing speed of the scrubber, which is used to scrub the top face portion of the foam metal with the active material, is varied to measure the amount of the impregnated active material and at time. The spatulas of the scrubber is this time uses approximately five neoprene rubber plates each being 3 mm in thickness. The length of each amplitude or number of cycles per second is varied to adjust the scrubbing speed.

The results in one embodiment with the amplitude (stroke) of 80 mm are shown in FIG. 10. As apparent from FIG. 10, the amount of impregnated active material becomes 80% or less by weight, indicating low values when the number of scrubbing operations is 0.5 cycle or less per second. However, it is found out that when the rate of scrubbing (scrubbing speed) increased, the impregnating rate increased and the required amount (impregnating rate 100%) could be impregnated at approximately two cycles per second (32 cm per second). In addition, it is found out that when the scrubbing speed increased, more resistance than required is applied upon the surface of the foam metal to crush the surface porous portion of the foam metal and to reduce the porosity, thus resulting in reduced foam metal thickness.

As the foam metal has numerous porous portions i.e. 96% in porosity and is made of a flexible material, a small load is likely to deform the foam metal or to crush the holes in the porous portion. Also, when an excessive load is applied, a cutting operation may be required. Thus, when the number of the scrubbing becomes three cycles (48 cm per second) or more per second, the amount of impregnated active material starts to be become reduced. In addition, at four cycles per second (64 cm per second), considerable stress is applied in the direction opposite the direction along which the foam metal moves. The foam metal is deformed so that it becomes difficult to be normally moved. The surface porous portion of the foam metal decreases to make the active material difficult to be impregnated. Accordingly, it is desired to have 0.7 to 4.0 cycles per second as the number of scrubber cycles to impregnate the required amount of active material i.e. 80% or more by weight.

The useful range from a practical standpoint is 0.7 to 4.0 cycles per second in scrubber revolution number. The values expressed in speed are as follows.

Assume that the amplitude of the scrubber is 80 mm, 0.7 cycles per second, $8 \times 2 \times 0.7 \approx 10$ cm per second 4.0 cycles per second, $8 \times 2 \times 4.0 \approx 64$ cm per second.

Accordingly, it follows that the optimum scrubbing speed range becomes 10 to 64 per second. Assume that the amplitude of the scrubber is made half, the number of cycles becomes twice. Regulation is performed by adjusting the moving distance of the scrubber.

The general equation representing the above description is as follows.

From the related equation of $Y = 2ax$ (wherein $Y =$ scrubbing speed, cm per second, $a =$ amplitude, cm, $x =$ number of cycles per second), the value of Y is desired to stay within the range of $10 \leq Y \leq 64$.

The amplitude $a$ becomes inversely proportional to the number of cycles $x$. When the amplitude becomes twice, the number of the cycles becomes half. The value of the amplitude a cannot be made greater without limitation. It is natural that the value of the amplitude a should be regulated by the size of the active material impregnating apparatus. Namely, when the amplitude a is made longer, the active material impregnating apparatus becomes correspondingly bigger. Stress is increased in the direction of progress with with respect to the foam metal. However, in the case of the opposite direction, the time during which the reverse stress is applied with respect to the direction of progress becomes longer. Due to the stress, more tension than required is applied to the foam metal, and thus the foam metal may be damaged. Thus, the time during which it is applied in the opposite direction is desirably not extremely long.

Accordingly, to reduce the abnormal tension on the foam metal or to reduce the size of the active material impregnating apparatus, the optimum conditions are such that the amplitude a stays within the range of $0 < a \leq 30$. Since the amplitude of 0 represents the case where the scrubber is in inoperative position, such case is impossible. In the case where the value of a is extremely small, one type of vibration phenomenon occurs, namely, the number of cycles per second has become greater. Even under such condition, the active material is impregnated into the foam metal and approximately 80% or more by weight is retained as the impregnating amount. Accordingly, the scrubber, together with the active material, is applied against the top face portion of the foam metal to cause the vibration phenomenon, whereby it is comparatively effective to impregnate the active material.

Also, when the amplitude becomes 30 cm or more, the entire apparatus becomes extremely large as described hereinabove, thus resulting in a considerable problem in the apparatus design or thus causing damage to the foam metal. Furthermore, when the number of the moving cycles per second of the scrubber increases, the degree becomes extremely large, making it impossible to impregnate the active material.

The amount of the impregnated active material in each impregnation procedure will now be compared. A few plates, each being impregnated in the substratum of 60 mm×300 mm, are provided for comparison. In one case where according to the conventional impregnating method, the active material which is properly mixed with rubber series resin adhesive agent is applied to the metallic mesh and is impregnated on the both sides of the metallic mesh through close contact with pressure by the roller press, the active material is impregnated by approximately 50±10 g and the fluctuating width of the impregnation is as great as ±20%. Also, the variation of impregnated amount is greater due to difficult adjustment of the thickness of the substratum. On the other hand, according to the impregnating method of the present invention, the active material is impregnated by approximately 80±4 g and the fluctuating width of the impregnation is as small as ±5%. As apparent from comparison between the present invention and the conventional method, in the present invention, approximately twice as much active material is impregnated. Moreover, the variation in the impregnated amount is small and the impregnation is uniform.

Also, even when the value of the amplitude a is extremely small (the scrubber is operated under the vibrating condition), the active material of approximately 70 g is impregnated. As compared with the case of 8 cm in amplitude, it is equivalent to approximately 90% and the active material is sufficiently impregnated even in the vibrating condition.

This involves the regulation of a within the range of $0 < a \leq 30$.

As described hereinabove, the present embodiment is advantageous in practical use, since the present embodiment provides the steps of regulating the scrubbing speed of scrubbing the top face portion of the foam metal, with a flexible scrubber, and with the active paste material being stirred thereby to ensure the impregnation of the required amount of active material. Thus the active material for the electrode of an alkaline battery is uniformly impregnated with reduced variation in the impregnated amount. This method is superior for mass production and provides stable quality.

A method of impregnating the active material into the foam metal more efficiently will be hereinafter described. The embodiment comprises a step of slightly increasing the paste concentration of the foam metal surface portion while scrubbing the top face portion of the foam metal with the active paste material and a powdered active material simultaneously, thereby to perform impregnation with pressure. Alternatively there may be employed a step of impregnating with pessure while scrubbing the powdered active materials into the foam metal to increase the content of the active material inside the foam metal after the impregnation of the active paste material.

The details will be described hereinafter with reference to the embodiment.

One example of the apparatus for impregnating the active material which is used for experiments will be described in construction hereinafter with reference to FIG. 11. This apparatus comprises at least either one step of passing the belt-shaped foam metal 29 through the active paste material 31 being stirred by the stirrer 30, and moving the foam metal through the action of a pair of driving rollers 33 and 34 while scrubbing the top face portion of the foam metal, together with the active material, by the scrubber 32 or one step of feeding and spreading the powdered active material 35 and 45 while the powdered active material is being vibrated by vibrators 36 and 37 during the impregnating operation of the active paste material into the foam metal or after the impregnating operation thereby to perform the impregnating operation by the scrubber 32.

To obtain active paste material 31, approximately 10% by weight of nickel powder as conductive material are added to the nickel hydroxide powders available on the market with proper mixing and stirring. Then, a proper amount of water or aqueous solution of carboxymethylcellulose is added thereto. Furthermore, they are properly stirred.

The active material 31 is put into the active material impregnating vessel 38. A motor 39 for driving the stirrer is operated to rotate the stirrer 30.

And the active paste material 31 is more properly mixed by the stirrer 30. The amount of the active material is adjusted so that the active material 31 may rise above the porous plate 40 and thus contact the bottom face of the foam metal 29. After the long belt type foam metal 29 has been impregnated, in its one portion, with water, the foam metal is moved into the active material impregnating vessel 38, through the action of the driving rollers 33, wherein the active material 31 is impregnated. Namely, the active paste material 31, which has been stirred by a stirrer 30 mounted in the active material vessel 38, is applied upon the long belt foam metal 29. The top face portion of the foam metal, together with the active material, is scrubbed by the scrubber 32 operated by the driving motor 41. At the same time, the powdered active material 35 passes through a porous filter 43 and is scattered on the top portion of the foam metal, which is impregnated with the active paste material, from a plate type supply passage for the powdered active material through action of the vibrator 36 mounted in the powdered active material supply vessel 42 with the powdered active material 35 contained therein. While the powdered active material is mixed with the active paste material by the scrubber, it is impregnated into the foam metal with increased paste concentration. Thereafter, the foam metal impregnated with the active material passes through a slit 50 to remove the extra active material on the surface portion. Then, the foam metal moves to the following step by a pair of rollers 34.

The above description is given with respect to a case where the powdered active material, together with the active paste material, is impregnated into the foam metal. However, without the simultaneous feeding operation of the powdered active material, the top face portion of the foam metal 29, together with the active paste material 31, is scrubbed by the scrubber 32 to impregnate the active paste material. Thereafter, the powdered active material is scattered and is impregnated into the foam metal.

Namely, the powdered active material 45 passes through the porous filter 46 and is scattered, through a plate type powdered active material supply passage 47, on the top face portion of the foam metal which has been impregnated with the active paste material, through the action of a vibrator 37 mounted in the powdered active material supply vessels 42 and 53 with the powdered active material 45 contained therein. The powdered active material 45 moves gradually into the interior from the top face portion while the powdered active material is being scrubbed by the scrubber 49 operated by the driving motor 48. In this step, the amount of the active material inside the foam metal increases. Some portion of the active material is replaced by the water in the active material inside the foam metal to serve to reduce the water content of the active material so that the active material can be impregnated in higher density. Likewise, the extra active material on the surface is removed through the slit 50 and moves to the next step by a pair of driving rollers 34. The above description is provided about two steps. However, since the same effect can be expected even through the simultaneous operation of the two steps. The feature of the present invention is to involve at least one of steps for impregnating the powdered active material.

The spreading condition of the powdered active material will be described hereinafter. Referring to FIGS. 12 and 13, numeral 32 is a scrubber. Numeral 51 is the spatula portion of the scrubber. Numeral 44 is a plate-shaped powder supply passage portion. Numeral 52 is an exit for the powdered active material.

The powdered active material 35 drops in through a slender porous filter 43 by the vibration of the vibrator 36 and is scattered on the top face portion of the foam metal 29. The exit 52 of the powdered active material is located in a position slightly higher than the surface of the foam metal 29. And the powders are impregnated, while being scrubbed by the spatulas 51 on the scrubber 32.

When the scrubber 32 moves right and left through some width, the exit 52 of the powdered active material is secured so that the powders 35 may drop inside through the scrubbing. To efficiently scrub and impregnate the powdered active material, the exit of the powdered active material is desired to move right and left, following the right and left movement of the scrubber 32.

Accordingly, one of the main features is that the powdered active material 35 normally drops inside the spatula 51 of the scrubber 32 and is scrubbed, impregnated by the spatula 51. However, if the powdered active material drops outside of the spatula of the scrubber, the powdered active material is adapted to be impregnated, since the foam metal 29 is moving.

However, as the powders which are not impregnated in this case are removed from the top face portion of the foam metal 29, there is a problem in that the impregnating operation cannot be performed efficiently. Also, the powdered active material is required to be continuously or intermittently distributed across the entire width of the foam metal to uniformly impregnate the powdered active material into the entire area of the foam metal. Once the powdered active material is spread only on one location, the impregnation is performed only on the location and its vicinity. The impregnation is difficult to be performed on locations except that location. Accordingly, it is better to continuously or intermittently spread the powdered active material over the entire width of foam metal to have the uniform impregnation. As shown in FIG. 14, to easily impregnate the powdered active material quantitatively, a slightly greater amount of powdered active material is desirably intermittently rather than continuously scattered, over the entire width of the foam metal 29. As the lateral width becomes greater, the effect is improved.

One of the features is that the active material is scattered over the entire lateral width of the foam metal.

The foam metal used is 60 mm in width, 1 m in length and 2.4 mm in thickness with porosity of $96\pm1\%$. The impregnated portion of the active material is approximately 10l in content. The weight of the active paste material is approximately 15 kg. The revolution speed of the stirrer is 1 to 3 revolutions per second. The moving speed of the foam metal is 0.5 mm per second.

The positive electrode substratum manufactured in the manner as described hereinabove is pressed, dried and cut into proper sizes. The lead plate is mounted thereto to serve as a positive electrode. Thus, such battery as shown in FIG. 8 is manufactured to compare the characteristics.

As the discharge conditions, 0.2 C (five-hour rate discharge) is provided. The discharge current is set at 1A in the conventional products I and II and is set at 2A in the present invention products III and IV. Charging is set at 150% of the discharge capacity. In 10 cycles, over which the capacity is stabilized, the respective discharge capacity is compared. The characteristics of the discharge capacity are shown in FIG. 15.

The conventional product I is a battery using positive electrodes. To manufacture each of the positive electrodes, the metallic porous plate is used for a core material. The active paste material is coated onto the metallic porous plate, is pressed and is brought into close contact. The conventional product II is a battery using positive electrodes. To manufacture each of the positive electrodes, the foam metal is used for core material. The active paste material is impregnated into the foam metal only through the scrubbing operation, is pressed and dried. The inventive product III is a battery using positive electrodes. To manufacture each of the positive electrodes, the foam metal is used as the core material. The active paste material is applied, while being stirred. At the same time, the powdered active material is scattered. Both active materials are scrubbed against the top face portion of the foam metal to perform the pressing and impregnating operations. The inventive product of IV is a battery using positive electrodes. To manufacture each of the positive electrodes, a method employed is to impregnate the active paste material while stirring the active paste material and while scrubbing the active material against the top face portion of the foam metal, then scattering the powdered active material, and performing the pressing and impregnating operations while scrubbing the active material against the top face of the foam metal with the scrubber.

As apparent from FIG. 15, in the conventional product I, the discharging capacity is 5.5 Ah when the threshold voltage has made 1.0 V. Also, in the conventional product II, the discharge capacity is 7.0 Ah. On the other hand, the product III of the present invention is 9.0 Ah in discharge capacity. In addition, the discharge capacity of the IV is 10 Ah. The conventional battery is small in discharge amount, since the amount of impregnated active material in the positive electrode is small and the impregnation is not much. Also, in the conventional method wherein the powdered active material is not impregnated if the active material is impregnated into the same foam metal, the discharge capacity rises to 7 Ah, but is not sufficient. As in the present invention, the discharge capacity is improved up to 9 to 10 Ah through including the impregnating step of the powdered active material. This is because the contained amount of the active material during the impregnating operation increases and much active material is impregnated per unit area. Impregnation of the powdered active material improves the impregnating density, since more impregnation is provided by replacing by the water and increasing the concentration of the active paste material in the foam metal. The discharge capacity 7 Ah of the conventional product II has a discharge capacity of only 70% as compared with 10 Ah capacity. The capacity is improved by approximately 30% through the impregnation of the powdered active material.

Under conditions where the concentration of the active paste material is extremely low, for example, at 60% or less by weight, the powdered active material is difficult to be uniformly impregnated into the interior of the foam metal even if the powdered active material is impregnated, since the water content is excessive. A condition where active paste material is impregnated to some extent is desirable. The powdered active material is impregnated by at least 30% or less to regulate the impregnated amount of the powdered active material, so that more active material may be more uniformly impregnated. After the active paste material has been uniformly impregnated to some extent, for example, 70% by weight, the method of impregnating the powdered active material is characteristic of the invention. Alternatively, powdered active material is impregnated simultaneously, with the active paste material, to increase the concentration of the active material on the face portion of the foam metal and to increase the impregnated density of the active material inside the foam metal. There is no great difference between the joint use of these steps and the case where the powdered active material and paste material have been impregnated separately, since the discharge characteristics are almost the same as those of the IV. However, there is big difference in comparison with the conventional product. A similar effect is provided through the joint use of these steps.

The main characteristics of the powdered active material impregnation are to improve the impregnating density of the active material in the foam material to improve the discharge capacity. However, the increased concentration of the active paste material from the beginning makes it difficult for the active material to move into the foam metal. Accordingly, as in the present invention, the active material is impregnated separately or at two stages. A better method of spreading the powdered active material is to spread the powdered active material over the entire width of the foam metal with the active paste material being impregnated therein. Also, the impregnating operation can be performed more efficiently by a method of scattering the powdered active material among the spatulas mounted on the scrubber. The same effect can be expected through the scattering operation of the powdered active material before the scrubber, which scrubs the powdered active material.

As described hereinabove, in the present embodiment, the method of manufacturing electrode for battery comprises the step of impregnating the powdered active material at least either during the impregnating operation of the active paste material or after the impregnating operation. This method can provide an alkaline battery of high capacity which can impregnate more active material more efficiently. This method is superior in mass production and extremely valuable in practical use.

Although the present invention has fully been described in connection with the preferred embodiments thereof with reference to the accompanying drawings, it is to be noted that various changes and modifications are apparent to those skilled in the art. Such changes and modifications are, unless they depart from the true scope of the present invention, to be understood as included within such true scope of the present invention.

What is claimed is:

1. In a method for manufacturing a battery electrode made of foam metal having a three-dimensional structure with continuously interlinked pores, said foam metal being impregnated with an active material, the improvement which comprises the steps of:
   a. providing a vessel containing a body of said active material in paste form and, above said body of active material but within said vessel, a perforated plate;
   b. causing a belt of said foam metal to continuously move over the surface of said perforated plate;
   c. causing said active material in paste form to flow from said vessel upwardly and around the periphery of said foam metal to be provided to the top surface of said foam metal at right angles to the direction of movement of said foam metal, and then into the interior of said foam metal, with a portion of said paste returning to said vessel from the underside of said foam metal, said flow being caused by stirring said paste within said vessel in a direction normal to the direction of movement of said foam metal thereby creating a zone of reduced pressure about the central portion of the underside of said foam metal; and d. further urging said active material in paste form into the pores of the top surface of said foam metal by sliding a scrubber comprising a plurality of spatulas along said top surface of said foam metal in a reciprocal manner, horizontally and parallel to the direction of movement of said foam metal, and wherein
   i. said belt of foam metal being contacted with a liquid prior to step c. whereby the liquid content of the pores of said foam metal is 20 to 60% by volume, the affinity of said pasted active material for said foam metal thus being increased;
   ii. the speed of the scrubber being correlated to the amplitude of its movement and the rate of its reciprocation being defined by the formula $Y = -2aX$, in which Y is the speed of the scrubber in cm/sec, a is the amplitude of the scrubber in cm. and X is the number of cycles per second;

whereby said active material is impregnated with in said foam metal uniformly and in high quantity.

2. The method according to claim 1 wherein the liquid content of the active material paste is 23 to 35 weight %.

3. The method according to claim 1 wherein the porosity of the foam metal is from 90–98%.

4. The method according to claim 1 which further comprises continuously or intermittently supplying active material in powdered form to the whole top surface of said foam metal in the direction of movement of said scrubber to thereby urge said active material into the pores of said foam metal, by the pressure of said spatulas against said foam metal.

5. The method according to claim 4 wherein the powdered active material impregnated into the pores of said foam metal is not more than 30 weight percent in relationship to the total amount of active material impregnated into the foam metal.

6. The method according to claim 1 wherein the spatulas are made of rubber.

7. The method according to claim 1 wherein the foam metal comprises nickel and the active material comprises nickel hydroxide.

* * * * *